Patented Mar. 30, 1937

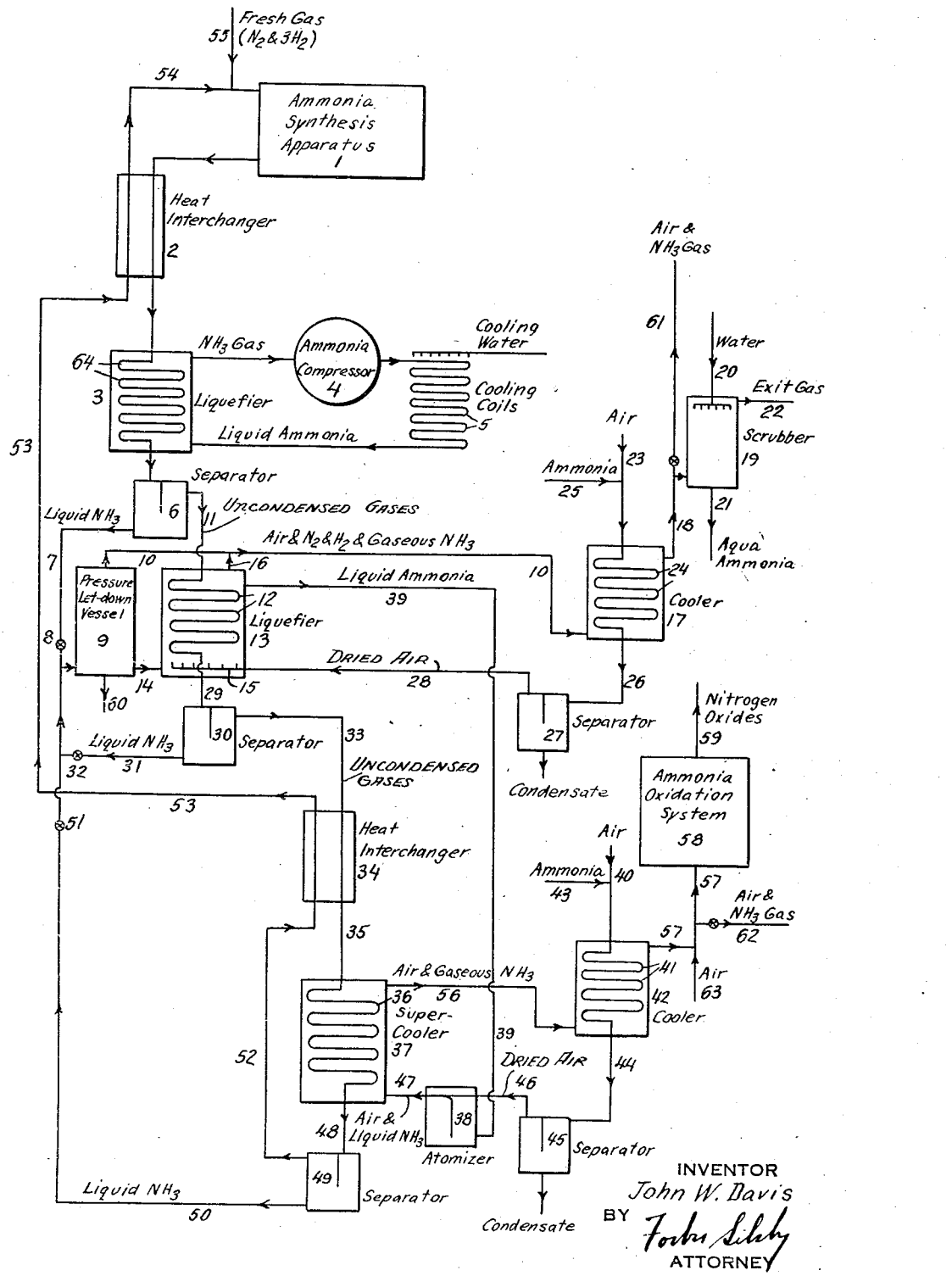

2,075,510

UNITED STATES PATENT OFFICE 2,075,510

PROCESS AND APPARATUS FOR THE TREATMENT OF GASES

John W. Davis, Prince George County, Va., assignor, by mesne assignments, to The Solvay Process Company, New York, N. Y., a corporation of New York Application December 20, 1930, Serial No. 503,735

13 Claims. (Cl. 23—162)

This invention relates to a process and apparatus for the treatment of ammonia-containing gases. More particularly, this invention relates to a process and apparatus for the recovery of ammonia product from ammonia synthesis gases by cooling the gases to condense liquid ammonia therefrom.

It has heretofore been proposed to recover synthetic ammonia produced by combination of its elements in contact with a catalyst by refrigerating the gaseous mixture of uncombined nitrogen and hydrogen and the ammonia product to a temperature at which ammonia is liquefied. After removal of the liquefied ammonia, the residual gases may be recirculated into contact with the catalyst for the production of additional ammonia product, and the synthesis gases again subjected to refrigeration to recover liquefied ammonia therefrom. Methods frequently employed for the refrigeration of the synthesis gases involve the absorption of heat from the gases by the evaporation of liquid ammonia by transfer of the heat to the evaporating ammonia either directly or through the mediary of a circulating refrigerant. The evaporated gaseous ammonia is compressed and cooled to condense it for use in cooling additional synthesis gas.

The gases leaving an ammonia synthesis converter consist of a small proportion of ammonia, together with the uncombined nitrogen and hydrogen. It is important, therefore, that the ammonia product be extracted from the synthesis gases as completely as is practicable before recirculating the uncombined nitrogen and hydrogen to the catalyst. Although the proportion of ammonia left in the synthesis gases decreases as the temperature to which the gases are cooled is decreased, it has heretofore not been considered economical to refrigerate ammonia synthesis gases by means of liquid ammonia to a temperature below about —33° C. (the boiling point of ammonia at atmospheric pressure) since the evaporation of ammonia at a lower temperature entailed maintaining the liquid ammonia under a pressure less than atmospheric by the use of expensive vacuum pumps and equipment suitable for operation at pressures below atmospheric.

While the synthetic ammonia process fixes nitrogen in the form of ammonia, it is often desired to obtain the nitrogen in the form of nitrogen oxides from which nitric acid or nitrates may be prepared. To this end synthesized ammonia is mixed with air or oxygen and the gas mixture passed over an ammonia oxidation catalyst.

It is an object of this invention to provide a process for cooling gases containing ammonia by evaporation of liquid ammonia without necessitating the maintenance of the evaporating ammonia under a vacuum. It is another object of this invention to provide a process which reduces the ammonia content of ammonia synthesis gases by intense refrigeration of the gases to temperatures below about —33° C. and without the use of a vacuum. It is a further object of this invention to provide a process for the refrigeration of ammonia synthesis gases and at the same time produce a gas mixture containing air and ammonia which is suitable as a starting material for the catalytic production of nitrogen oxides. It is likewise an object of this invention to provide an economical process for the production of nitrogen oxides by the synthesis of ammonia from its elements and the oxidation of the ammonia thus produced by means of air to form nitrogen oxides. Other objects of the invention will in part be obvious and will in part appear hereinafter.

The invention comprises subjecting a gas containing ammonia to a cooling action obtained by passing air in direct contact with liquid ammonia to evaporate ammonia therefrom and treating the mixture of air and ammonia thus produced for the oxidation of the ammonia. In treating ammonia synthesis gases in accordance with this invention to recover ammonia product by liquefaction of the ammonia gas contained therein, the synthesis gases are subjected to a cooling action obtained by introducing air into contact with liquid ammonia which is preferably the liquefied ammonia product, and the mixture of air and ammonia thus produced is passed to an ammonia oxidation catalyst.

In its preferred embodiment, this invention comprises cooling ammonia synthesis gases to condense liquid ammonia contained therein. The condensed liquid ammonia is separated from the uncondensed gases and is passed in indirect heat exchange with the uncondensed gases while air is passed in direct contact with the separated liquid ammonia to evaporate ammonia therefrom and to refrigerate the synthesis gases, preferably to a temperature below about —33° C., whereby additional ammonia product is condensed and recovered before returning the residual uncondensed synthesis gases to the ammonia catalyst. The mixture of air and ammonia gas thus produced is catalytically treated to oxidize the ammonia to nitrogen oxides.

The invention accordingly comprises the several steps and the relation of one or more of such steps with respect to each of the others thereof which will be exemplified in the process hereinafter described and the scope of the invention will be indicated in the claims.

For a fuller understanding of the nature and objects of the invention, reference should be had to the following detailed description taken in connection with the accompanying drawing which illustrates a process for the synthesis of ammonia from its elements and oxidation of the ammonia to nitrogen oxide gas employing the process of this invention.

In the drawing, numerals 1, 2 and 3 designate respectively, an ammonia synthesis apparatus, heat interchanger and an ammonia liquefier for the recovery of ammonia product produced by the catalysis of the nitrogen-hydrogen gas passed in contact with an ammonia catalyst in the synthesis apparatus 1. Synthesis apparatus 1 may include a converter, heat interchangers, water-cooled coils, for removing heat from the synthesized gases, and a circulating compressor, all of which is well known in the art. As heretofore practiced, the nitrogen-hydrogen gases leaving the ammonia liquefier 3, after separation from the liquid ammonia condensed therein and, if desired, after treatment in a second liquefier for condensation of an additional quantity of ammonia product, are returned through heat interchanger 2 to synthesis apparatus 1.

In employing the process of this invention, the synthesis gases are cooled in liquefier 3 in any well known manner, for example, by means of liquid ammonia which is evaporated within the liquefier about a coil 64 through which the synthesis gases are passed. The ammonia gas is withdrawn from liquefier 3, compressed in ammonia compressor 4, and reliquefied in cooling coils 5. The liquefied ammonia is returned for re-use in liquefier 3. The thus cooled gases pass from liquefier 3 into a separator 6 where the condensed ammonia is removed from the residual uncondensed gases and is passed through a pipe 7 and a valve 8 to a pressure let-down vessel 9. When the high pressure upon the liquid ammonia is released, nitrogen and hydrogen gas which were contained in the liquid ammonia in solution is evolved. This gas is removed from pressure let-down vessel 9 through a pipe 10. The uncondensed gases from separator 6 pass through a pipe 11 into a cooling coil 12 in a liquefier 13. Coil 12 is immersed in liquefier 13 in a body of liquid ammonia which is supplied from pressure let-down vessel 9 through a pipe 14.

Air is introduced into the liquid ammonia in liquefier 13 from the perforated pipe 15 and passes upwardly through the liquefier in direct contact with liquid ammonia therein. A portion of the ammonia evaporates into the air and a mixture of air and gaseous ammonia passes out of the top of liquefier 13 through a pipe 16. This gaseous mixture, together with the gases evolved from pressure let-down vessel 9, are passed into and through a cooler 17 and thence through a pipe 18 to a scrubber 19. In scrubber 19 the gases are washed with water from a pipe 20 to absorb the ammonia contained therein to form aqua ammonia which is withdrawn from the scrubber through pipe 21, while the residual unabsorbed gas leaves the scrubber through a pipe 22 and may be discharged to the atmosphere or otherwise treated as may be desired. Air is passed from a pipe 23 through a coil 24 in cooler 17 in heat exchange with the gases passing through this cooler which serve to cool the incoming air from pipe 23. This air, which is to be introduced into the liquid ammonia in liquefier 13 as described above, will generally contain sufficient amounts of moisture which, if allowed to remain in the air, would, upon its being intensely cooled in perforated pipe 15, tend to condense out and freeze and thus stop up the perforations in the pipe. In order to remove in part the moisture content of the air and to prevent the residual moisture forming a solid in pipe 15, a small amount of ammonia is introduced from a pipe 25 into the air passing through pipe 23 and cooler 17. When the air containing ammonia is cooled in coil 24, moisture condenses therefrom and absorbs ammonia to form an ammoniacal aqueous liquor which remains liquid at low temperatures. The thus cooled air passes through a pipe 26 to a separator 27 where the condensed ammoniacal liquor is separated out and the thus dried air containing residual ammonia passes through a pipe 28 to perforated pipe 15 in liquefier 13.

As a result of the cooling of the synthesis gas during its passage through coil 12, ammonia contained therein liquefies. The cooled gas carrying liquefied ammonia passes through a pipe 29 to a separator 30 where the liquid ammonia separates from the uncondensed gases. The liquid ammonia is withdrawn from separator 30 through a pipe 31 and valve 32 and passed to pressure let-down vessel 9 where it gives up nitrogen and hydrogen contained in solution, which evolved gases mingle with the gases evolved from the liquid ammonia from separator 6 and are treated as above described. The uncondensed gas from separator 30 passes through a pipe 33, heat interchanger 34 and pipe 35 into and through a coil 36 contained in super cooler 37. An atomizer 38 is supplied with liquid ammonia from liquefier 13 by means of an overflow pipe 39. Air from a pipe 40 is passed through coil 41 in a cooler 42. As described above, with respect to the air employed in liquefier 13, the air from pipe 40 receives an addition of ammonia from a pipe 43 and, upon being cooled in cooler 42, moisture is condensed out to form a liquid ammoniacal condensate. The thus treated air passes through a pipe 44 to a separator 45 where the condensate is separated out and the thus treated air passed through a pipe 46 into atomizer 38. The liquid ammonia supplied to atomizer 38 is converted into a spray by means of the air from pipe 46, which is passed through a pipe 47 into super-cooler 37. The sprayed ammonia evaporates into the air and the mixture of air and gaseous ammonia passes upwardly through super-cooler 37 about coil 36. By the evaporation of the liquid ammonia into the air, the ammonia-containing gas passing through coil 36 is intensely cooled to a temperature at which additional liquid ammonia condenses therefrom. The gas containing condensed ammonia passes through a pipe 48 to a separator 49 where the liquefied ammonia is separated from the uncondensed gases. The separated liquid ammonia passes through a pipe 50 and valve 51 to pressure let-down vessel 9 where dissolved nitrogen and hydrogen are released and mingle with the gases evolved from the liquid ammonia from separators 6 and 30 for treatment as described above. The uncondensed gases in separator 49 pass through a pipe 52 and heat interchanger 34 where they serve to extract heat from the gases passing through the heat interchanger on their way to super-cooler 37. From heat interchanger 34 the gas is passed through a pipe 53 to and through heat interchanger 2 and thence is returned to ammonia synthesis apparatus 1 through a pipe 54. In heat interchanger 2 the cooler gases from heat interchanger 34 serve to extract heat from the gases passing from ammonia synthesis apparatus 1 to liquefier 3. Before returning to ammonia synthesis apparatus 1, the gases passing through pipe 54 receive an addition of fresh nitrogen-hydrogen gas from a pipe 55 which replaces the nitrogen and hydrogen combined in ammonia synthesis apparatus 1 to form ammonia and removed from the synthesis gases in separators 6, 30 and 49.

The mixture of air and gaseous ammonia which is formed in super-cooler 37 passes from the super-cooler through a pipe 56 to cooler 42 where it serves to cool the air passing through coil 41 of the cooler. From cooler 42 the mixture of air and ammonia passes through a pipe 57 to an ammonia oxidation system 58 where it is treated in any well known manner to oxidize the ammonia by means of the oxygen contained in the mixture of air and ammonia. Nitrogen oxides are formed as a result of the oxidation of the ammonia and are withdrawn from the ammonia oxidation system 58 through a pipe 59. The gas from the oxidation system may be treated in any desired manner to recover the nitrogen oxides separate from the gases with which they are admixed, or the nitrogen oxides may be absorbed by means of soda ash to form sodium nitrate, or the nitrogen oxide-containing gas may be treated in any desired manner for its utilization.

As is well known, liquid ammonia in contact with an atmosphere consisting of ammonia gas under a pressure of one atmosphere, evaporates only at temperatures of about −33° C. By introducing air into contact with liquid ammonia in super-cooler 37 and/or atomizer 38, on the other hand, the atmosphere in contact with the liquid ammonia consists of a mixture of air and ammonia gas. I have found that liquid ammonia will evaporate at temperatures below −33° C. under a pressure of one atmosphere or more when maintained in contact with a gas consisting of air and gaseous ammonia. The temperature at which the liquid ammonia will evaporate and to which a material may be cooled by absorption of heat when the ammonia changes from the liquid to the gaseous phase, is dependent for any given total gas pressure over the evaporating liquid, upon the proportion of air and ammonia gas in the atmosphere to which the liquid ammonia is exposed. In the form of apparatus shown in the drawing, where the liquid ammonia is introduced by means of an atomizer, the proportion of ammonia to air is controlled by the relation between the rate of flow of the air and the rate with which liquid ammonia is aspirated thereinto. It is apparent, however, that other means may be employed for the evaporation of ammonia to cool the gas passing through coil 36. For example, the liquid ammonia from liquefier 13 may pass directly into super-cooler 37 and a body of liquid ammonia may be maintained therein into which air is injected by means of a perforated pipe leading from separator 45. Such an apparatus is similar to the arrangement of liquefier 13. Employing such a design for super-cooler 37, the proportion of air and ammonia gas in the atmosphere with which the liquid ammonia is contacted is a function both of the rate with which the air is introduced into contact with the liquid ammonia and the mixture of air and ammonia removed therefrom, and of the rate of evaporation of the ammonia into the air which increases or decreases as the amount of heat supplied to the evaporating ammonia by the gases passing through coil 36 or from the atmosphere about super-cooler 37 is increased or decreased. Whatever the form of apparatus employed for the super-cooler may be, however, by an appropriate correlation of the pressure and the proportions of air and ammonia evaporated thereinto, the synthesis gas passing through coil 36 may be refrigerated to a temperature as low as about −60° C. or below without necessitating evaporating under a vacuum the liquid ammonia employed for the cooling, which would entail expensive equipment and a constant expenditure of energy to maintain the evaporating ammonia under a pressure below atmospheric.

The arrangement of apparatus shown in the drawing and described above provides a process which is flexible and readily adaptable to meet the varying demands of a variety of products. Liquid ammonia may be withdrawn from pressure let-down vessel 9 through a pipe 60, aqua ammonia may be obtained from scrubber 19, a mixture of air and ammonia may be obtained by tapping the same from pipes 18 and/or 57 by means of pipes 61 and 62 respectively and nitrogen oxides may be obtained from ammonia oxidation system 58. By varying the temperatures to which the synthesis gases are successively cooled in liquefiers 3 and 13 and in super-cooler 37, the proportions of these various products which may be recovered from the system may be varied within relatively wide limits.

The preferred refrigeration system and process embodies a further advantage of moment. By operating liquefier 13 employing air injected into direct contact with the liquid ammonia therein, residual dissolved nitrogen and hydrogen gas in the liquid ammonia from pressure let-down vessel 9, which was not removed from the ammonia in that vessel, is driven out of the liquid ammonia with the air and gaseous ammonia. The liquid ammonia overflowing from liquefier 13 to atomizer 38 is, therefore, substantially free from dissolved nitrogen and hydrogen and the gaseous mixture of air and ammonia formed in super-cooler 37 is of particular value for use as the starting material for the oxidation of the ammonia since it contains substantially no hydrogen which would be burned in the ammonia oxidation system. It should be noted, however, that under certain conditions of operation it may be desired to secure the benefit derivable from using the intensely cooled liquid ammonia product from separator 49 for directly atomizing it in super-cooler 37 without allowing it to become mixed with the product from separators 6 and 30. By operating in this manner, the energy losses from the system may be minimized and, under certain circumstances, it may be found that this advantage more than compensates for the disadvantage involved in this mode of operation of introducing into the air and gaseous ammonia mixture obtained from super-cooler 37, the nitrogen and hydrogen contained in solution in the liquid ammonia from separator 49.

As illustrative of temperature conditions in the liquefiers and super-coolers which may be maintained employing the process of this invention, the following are given by way of illustration, but it is understood that the invention is in no wise limited to these particular conditions. The gas from ammonia synthesis apparatus 1, after passage through heat interchanger 2, may be cooled in liquefier 3 to a temperature of about −10° C. In liquefier 13 the gas passing through coil 12 may be lowered to about −30° C. and the gas then supercooled in coil 36 to a temperature of, for example, about −60° C. By employing the process as described for the refrigeration in super-cooler 37 of ammonia synthesis gases which have previously been cooled in liquefiers 3 and 13, the gases may be readily cooled to a very low temperature whereby substantially all of the ammonia contained therein is condensed and recovered separate from the uncondensed gases which are returned to ammonia synthesis containing but a relatively small amount of ammonia.

The proportions of air and ammonia in the gas mixture introduced to the ammonia oxidation system may be adjusted, for example, by introducing additional air thereto from a pipe 63. If desired, the proportion of air and gaseous ammonia leaving super-cooler 37 may be controlled to give a mixture suitable for treatment in oxidation system 58, by introducing a desired portion of ammonia into the air from atomizer 38.

In employing the type of super-cooler described above wherein a body of liquid ammonia is maintained about coil 36 and air is introduced thereto from a perforated pipe, the rate of flow of air from the perforated pipe into contact with liquid ammonia in the super-cooler may be adjusted with respect to the rate of evaporation of the liquid ammonia so as to result directly in the production of a mixture of air and liquid ammonia of the desired composition. Or, the composition of the gas mixture from this type of super-cooler may be adjusted by controlling the pressure at which the air is passed in contact with the liquid ammonia contained therein. For example, if it be desired to evaporate the ammonia from a body of the same contained in super-cooler 37 at a temperature of −60° C. this may be accomplished and a mixture of air and ammonia containing about 10% ammonia may be obtained by maintaining the air passed through the super-cooler under a pressure of about 2.2 atmospheres.

Since certain changes in carrying out the above process and in the constructions set forth which embody the invention may be made without departing from its scope, it is intended that all matter contained in the above description or shown in the accompanying drawing shall be interpreted as illustrative and not in a limiting sense.

I claim:

1. In a process for the production of nitrogen oxides by the synthesis of ammonia from its elements and oxidizing the ammonia thus produced, that improvement which comprises cooling the ammonia containing gases from an ammonia synthesis catalyst to a temperature at which liquid ammonia condenses therefrom, separating the condensed liquid ammonia from the uncondensed gases, refrigerating the uncondensed gases to condense additional liquid ammonia therefrom by subjecting them to a cooling action obtained by introducing air into direct contact with the separated liquid ammonia to evaporate ammonia therefrom, and passing the air-ammonia mixture from the refrigeration step into contact with an ammonia oxidation catalyst maintained at oxidation temperatures.

2. In a process for the production of nitrogen oxides by the synthesis of ammonia from its elements, recovering the synthesized ammonia by cooling the synthesis gases to condense liquid ammonia therefrom and oxidizing ammonia thus obtained, that improvement which comprises subjecting said synthesis gases to a cooling action obtained by introducing air into direct contact with said liquid ammonia to evaporate ammonia therefrom, and introducing the mixture of air and ammonia thus produced to an ammonia oxidation catalyst maintained at oxidation temperature.

3. In a process for the production of nitrogen oxides by the synthesis of ammonia from its elements and oxidizing ammonia thus produced, that improvement which comprises cooling the ammonia containing gases from an ammonia synthesis catalyst to liquefy ammonia therefrom, separating the liquefied ammonia from the uncondensed gas, passing air in contact with said liquefied ammonia to evaporate ammonia therefrom to form a mixture of ammonia and air, subjecting the aforesaid ammonia containing gases to the cooling action obtained by the evaporation of the liquefied ammonia to thereby accomplish the said cooling of the ammonia containing gases, and then introducing the mixture of air and ammonia thus produced to an ammonia oxidation catalyst maintained at oxidation temperatures.

4. In a process for the production of nitrogen oxides by the synthesis of ammonia from its elements and oxidizing ammonia thus produced, that improvement which comprises cooling the ammonia containing gases from an ammonia synthesis catalyst to liquefy ammonia therefrom, separating the liquefied ammonia from the uncondensed gas, introducing air dried as hereinafter described into direct contact with said liquid ammonia to form a mixture of air and ammonia, passing the mixture of air and ammonia in indirect heat exchange with the aforesaid uncondensed gas, passing the resulting mixture of air and gaseous ammonia in indirect heat exchange with air containing moisture and gaseous ammonia to condense from the moist air an ammoniacal aqueous liquor and to dry the air, and then introducing the said mixture of air and gaseous ammonia to an ammonia oxidation catalyst maintained at oxidation temperatures.

5. In a process for the production of nitrogen oxides by the synthesis of ammonia from its elements and oxidizing ammonia thus produced, that improvement which comprises cooling the ammonia containing gases from an ammonia synthesis catalyst to liquefy ammonia therefrom, separating the liquefied ammonia from the uncondensed gas, evaporating a portion of said liquid ammonia to reduce the content of dissolved gas in the residual unevaporated ammonia, introducing air into direct contact with said residual ammonia to evaporate ammonia therefrom, passing the resulting mixture of air and gaseous ammonia in contact with an ammonia oxidation catalyst maintained at oxidation temperatures, and during the aforesaid steps condensing liquid ammonia from the gases from ammonia synthesis by subjecting said gases to the cooling action obtained by the aforesaid introduction of air into contact with said liquid ammonia to evaporate ammonia.

6. In a process for the production of nitrogen oxides by the synthesis of ammonia from its elements and oxidizing ammonia thus produced, that improvement which comprises cooling the ammonia containing gases from an ammonia synthesis catalyst to liquefy ammonia therefrom, separating the liquefied ammonia from the uncondensed gas, reducing the pressure upon the separated liquid ammonia to evolve gas dissolved therein, introducing air into direct contact with thus treated liquid ammonia to evaporate ammonia therefrom, passing the resulting mixture of air and gaseous ammonia in contact with an ammonia oxidation catalyst maintained at oxidation temperatures, and during the aforesaid steps condensing liquid ammonia from the gases from ammonia synthesis by subjecting said gases to the cooling action obtained by the aforesaid introduction of air into contact with said liquid ammonia to evaporate ammonia.

7. In a process for the production of nitrogen oxides by the synthesis of ammonia from its elements and oxidizing ammonia thus produced, that improvement which comprises cooling the ammonia containing gases from an ammonia synthesis catalyst to liquefy ammonia therefrom, separating the liquefied ammonia from the uncondensed gas, passing air in direct contact with said liquid ammonia to evaporate a portion only thereof and to thereby reduce the content of dissolved gas in the residual unevaporated liquid ammonia, introducing air into direct contact with said residual ammonia to evaporate ammonia therefrom, passing the resulting mixture of air and gaseous ammonia in contact with an ammonia oxidation catalyst maintained at oxidation temperatures, and during the aforesaid steps subjecting gases from ammonia synthesis to the cooling action obtained by the aforesaid treatments of liquid ammonia with air.

8. In a process for the production of nitrogen oxides by the synthesis of ammonia from its elements under pressure and oxidizing ammonia thus produced, that improvement which comprises cooling the ammonia containing synthesis gas under elevated pressure to liquefy ammonia therefrom, separating the liquefied ammonia from the uncondensed gas, reducing the pressure upon the separated liquid ammonia to evolve gas dissolved therein, passing air in direct contact with said liquid ammonia to evaporate a portion only thereof, removing the unevaporated liquid ammonia from contact with the resulting mixture of air and gaseous ammonia containing residual desorbed gas, introducing air into direct contact with said unevaporated liquid ammonia to evaporate the same, passing the resulting mixture of air and gaseous ammonia in contact with an ammonia oxidation catalyst maintained at oxidation temperatures, and during the aforesaid steps refrigerating ammonia synthesis gas by subjecting it in stages to the cooling action obtained by the aforesaid introduction of air into contact with said liquid ammonia to evaporate ammonia.

9. In combination in an apparatus for the synthesis of ammonia from its elements and the oxidation of ammonia to nitrogen oxides, an ammonia liquefier, means for passing ammonia synthesis gases through said liquefier, a super-cooler, means for introducing air into direct contact with liquid ammonia, means for passing the uncondensed gases from said liquefier in indirect heat exchange with the mixture obtained by introducing the air into the liquid ammonia and means for passing an ammonia-air mixture from said vessel into contact with an ammonia oxidation catalyst.

10. In a process for the production of nitrogen oxides by the synthesis of ammonia from its elements and oxidizing the ammonia thus produced, that improvement which comprises cooling the ammonia containing gases from an ammonia synthesis catalyst to a temperature at which liquid ammonia condenses therefrom, separating the condensed liquid ammonia from the uncondensed gases, subjecting the uncondensed gases to a cooling action obtained by introducing air into direct contact with the separated liquid ammonia to evaporate ammonia therefrom and form a gaseous mixture containing ammonia and oxygen, passing the air-ammonia mixture from the refrigeration step into contact with an ammonia oxidation catalyst maintained at oxidation temperatures, and during the aforesaid steps controlling the proportion of ammonia in said gaseous mixture by adjusting the rate of heat supply to the evaporating ammonia and the pressure maintained during the passage of the gas containing free oxygen in contact with the liquid ammonia.

11. In a process for the production of nitrogen oxides by the synthesis of ammonia from its elements under pressure and oxidizing ammonia thus produced that improvement which comprises carrying out the following procedural steps: (1) cooling an ammonia-containing synthesis gas to condense liquid ammonia therefrom and separating the liquefied ammonia from the uncondensed gases; (2) passing air in direct contact with liquid ammonia condensed from said synthesis gas to evaporate a portion only of said liquid ammonia; (3) passing the gaseous mixture of air and ammonia thus obtained in heat transfer relation with air on its way to contact with the liquid ammonia in step (2); (4) separately introducing air into direct contact with the unevaporated liquid ammonia from step (2) to evaporate the same; (5) passing the resulting mixture of air and gaseous ammonia in heat transfer relation with air on its way to contact with the liquid ammonia in step (4) and thence in contact with an ammonia oxidation catalyst maintained at oxidation temperatures; (6) subjecting the aforesaid cooled synthesis gas in stages to the cooling actions obtained in steps (2) and (4) by evaporation of liquid ammonia in contact with air to condense liquid ammonia from the synthesis gas; (7) separating the liquid ammonia condensed in step (6) from the uncondensed gas and reducing the pressure upon the separated liquid ammonia to evolve from it gas dissolved therein; and (8) utilizing the liquid ammonia obtained in step (7) in carrying out the procedure of step (2).

12. In a process for the production of nitrogen oxides that improvement which comprises cooling ammonia containing gases from an ammonia synthesis catalyst to a temperature at which liquid ammonia condenses therefrom, separating the condensed liquid ammonia from the uncondensed gases, refrigerating the uncondensed gases to condense additional liquid ammonia therefrom by subjecting them to a cooling action obtained by introducing air into direct contact with the liquid ammonia condensed from said ammonia containing gases to evaporate ammonia from the liquid ammonia and to produce a mixture of air and ammonia, passing said mixture of air and ammonia in indirect heat exchange with the air on its way to direct contact with said liquid ammonia, and passing the air-ammonia mixture from the refrigration step into contact with an ammonia oxidation catalyst maintained at oxidation temperatures.

13. In a process for the production of nitrogen oxides that improvement which comprises cooling the gases from an ammonia synthesis catalyst to a temperature at which liquid ammonia is condensed therefrom, separating the condensed liquid ammonia from the uncondensed gases, introducing air into direct contact with liquid ammonia thus condensed and separated from said uncondensed gases to evaporate ammonia therefrom and to produce a mixture of air and ammonia, said cooling of the gases being carried out at least in part by subjecting them to the cooling action obtained by introducing said air into contact with said liquid ammonia, passing said mixture of air and ammonia in indirect heat exchange with air containing moisture and gaseous ammonia to condense therefrom an ammoniacal aqueous liquor and to dry the air and then introducing a portion of the mixture of air and ammonia into contact with an ammonia oxidation catalyst maintained at oxidation temperatures and employing the thus dried air as the aforesaid air introduced into direct contact with liquid ammonia.

JOHN W. DAVIS.

CERTIFICATE OF CORRECTION.

Patent No. 2,075,510. March 30, 1937.

JOHN W. DAVIS.

It is hereby certified that error appears in the printed specification of the above numbered patent requiring correction as follows: Page 5, second column, line 2, claim 9, after "catalyst" insert the words maintained at oxidation temperatures; and that the said Letters Patent should be read with this correction therein that the same may conform to the record of the case in the Patent Office.

Signed and sealed this 1st day of June, A. D. 1937.

(Seal)

Henry Van Arsdale
Acting Commissioner of Patents.